(12) United States Patent
Tseng et al.

(10) Patent No.: US 9,664,802 B1
(45) Date of Patent: May 30, 2017

(54) SIMPLIFIED RADIATION SPECTRUM ANALYZER

(71) Applicant: Institute of Nuclear Energy Research, Atomic Energy Council, Executive Yuan, R.O.C., Taoyuan (TW)

(72) Inventors: Hsun-Hua Tseng, Taoyuan (TW); Tin-Yu Liaw, Taoyuan (TW)

(73) Assignee: INSTITUTE OF NUCLEAR ENERGY RESEARCH, ATOMIC ENERGY COUNCIL, Executive Yuan, R.O.C., Lungtan, Taoyuan (TW)

( * ) Notice: Subject to any disclaimer, the term of this patent is extended or adjusted under 35 U.S.C. 154(b) by 118 days.

(21) Appl. No.: 15/190,410

(22) Filed: Jun. 23, 2016

(51) Int. Cl.
*G01T 1/36* (2006.01)

(52) U.S. Cl.
CPC ..................... *G01T 1/36* (2013.01)

(58) Field of Classification Search
CPC .. G01T 1/17; G01T 1/208; G01T 1/169; G01T 1/36
See application file for complete search history.

(56) References Cited

U.S. PATENT DOCUMENTS

| | | | | |
|---|---|---|---|---|
| 4,859,853 A * | 8/1989 | Kronenberg | ............... | G01T 1/24 250/370.07 |
| 7,411,198 B1 * | 8/2008 | Holland | ................... | G06G 7/18 250/370.01 |
| 2003/0105397 A1 * | 6/2003 | Tumer | .................. | G01T 1/2985 600/436 |
| 2006/0243916 A1 * | 11/2006 | Sergent | ..................... | G01T 1/17 250/370.06 |
| 2007/0262251 A1 * | 11/2007 | Balan | ...................... | G01T 1/171 250/252.1 |
| 2008/0093560 A1 * | 4/2008 | Puhakka | ........... | H01L 27/14634 250/370.08 |

* cited by examiner

*Primary Examiner* — Marcus Taningco
(74) *Attorney, Agent, or Firm* — Jackson IPG PLLC; Demian K. Jackson

(57) ABSTRACT

A simplified device is provided for analyzing radiation spectrum. A detector absorbs radioactive particles for generating signal pulses. A signal converter is connected with the detector to discriminate and amplify the signal pulses to be converted into digital pulses. The microcomputer single-chip is connected with the signal converter to measure dual-channel pulse widths for statistical analysis and to measure pulse free count. Under a very low power mode, a pair of information comprising random physical memory spectrum and pulse count are generated. The microcomputer single-chip has a low cost and can be abundantly supplied. Thus, by using the microcomputer single-chip as a touch-driven application, a reading module replaces the high-frequency precision clock. The reading module is built-in for charging voltages with constant-current pulses. Consequently, spectrum analysis is performed for the signal pulses of gamma ray detected by the detector.

10 Claims, 6 Drawing Sheets

SIMPLIFIED RADIATION SPECTRUM ANALYZER

TECHNICAL FIELD OF THE INVENTION

The purpose of present invention is to fulfil miniaturization and disposable requirements of radiation detection and isotope identification device for routine contamination survey of embedded drain pipeline network with wide variety of diameter size distributed around nuclear facilities; more specifically, it relates to utilize a cheap single chip low power microcomputer for pulse spectrum analysis and nuclides identification of room temperature detectors.

DESCRIPTION OF THE RELATED ARTS

Routine drain pipeline radiation pollution detections are greatly demanded by government environment protection authorities for nuclear facilities such as nuclear power reactors, high-energy accelerators and strong ionizing radiation generator using artificial isotopes widely used for industrial or medical applications. A detector having small signal to noise ratio at room temperature is required within constraints of size, weight, sensitivity, cost and ruggedness for long-term room-temperature applications.

However, expensive high speed high-precision pulse conditioning and analog-to-digital converter (ADC) electronics designed for high-resolution spectrum analysis equipment used in laboratory is far beyond field requirements. Hence, a mass-produced, disposable, inexpensive, lightweight, low-power-consumed and precise analyzer for rapid radiation detection becomes a key to effectively detection of drain pipeline radiation pollution.

For now, the devices used for radioisotope nuclide detection and analysis are functioned by receiving radiation-striking with a detector. Free charge generated by absorbing energy is collected to be converted into pulses related to height and energy. Then, after the pulses are shaped into quasi-Gaussian shapes by an active filter, the pulse heights kept at a low-leakage capacitance are picked. Or, the pulse heights are directly measured by a successive approximation ADC; or by using a Wilkinson ADC through charging at a constant current and releasing time for precise timing. At last, distribution statistics of radiation pulse heights are processed to further identify radioisotope nuclides.

After modern digital signal processing chip is introduced, pulse shaping and peak measuring are replaced by digital calculation. Although system adjustment and accuracy control are greatly simplified and improved, a high-speed flash analog/digital converter is still required to intensively sample pulses and process a lot of calculations without reducing hardware complexity and cost.

A germanium or silicon detector using liquid nitrogen as a cooling agent has a high resolution; but, its sensitivity is low and is very time-consuming to achieve a stable working status. Concerning circuit design, a rarely-used precise electronic device, like a low-noise preamplifier, a shaping amplifier or a high-speed analog/digital converter, is required with precise calibration. Yet, there are few applications of modern mass-produced, low cost, high density and high speed digital integrated circuit. Therefore, not only the cost is high; but also portability is poor, power requirement is harsh, assembly is troublesome and maintenance is not easy. As a result, the detector for high-resolution spectrum is only used in laboratories having good environment of high-level equipments, but is not applicable in radioactive contamination investigation of buried pipelines at inside and outside areas of a plant.

Modern peak analysis for analog/digital converter tends to design a compact power-saving dual-input-channel high-speed pulse analysis chip. In FIG. 5, the conventional peak analysis for the analog/digital converter has a basic working principle based on the linear relationship between pulse peak and energy. The high-speed flash analog/digital converter intensively samples pulses with computations for spectrum analysis. There is no place for using field programming gate array (FPGA), whose hardware complexity and cost are incommensurate to a cheap detector operated under room temperature.

Another prior art is shown in FIG. 6. Pulse width has a log ratio to pulse peak or energy. Because the detector operated under a room temperature only needs a low spectrum resolution, the log ratio along with a look-up table for corresponding energy can build a device for spectrum analysis similar to the conventional peak analysis using the analog/digital converter. Not only the complex pre-pulse shaping circuit is not required; but also the device can be well applied on digital integrated circuit for dramatically lowering the thresholds of hardware quality and cost. In addition, the detector is suitable for a detecting array. Timing counts of multi-channel pulse inputs provide multiple spectra used by high-sensitivity 4π activity measurement. The coincidence/anti-coincidence simultaneous measurement is a function far better than the traditional analog/digital converter for spectrum analysis.

However, the prior art works with high-frequency timing pulse width count, and needs a precisely-adjustable clock up to megahertz (MHz) and a high-speed counter. A specific design of field programmable gate array (FPGA) of high-frequency field programmable integrated circuit is a common solution; but the solution is not suitable for power-consuming applications, such as the radioactive contamination investigation of buried pipelines inside and outside of a plant. Its size, cost and power-consumption are still unsatisfactory.

Hence, the prior arts do not fulfill all users' requests on actual use.

SUMMARY OF THE INVENTION

The main purpose of the present invention is to provide a microcomputer single-chip having a built-in reading module for analyzing spectrum of signal pulses of gamma ray sensed by a detector under a very-low power mode, where radiation-polluted nuclides are identified by the detector at a room temperature for gamma-lay contamination investigation of long small-caliber pipelines buried at inside and outside areas of a plant.

To achieve the above purpose, the present invention is a simplified analyzer for radiation spectrum, comprising a detector, a signal converter and a microcomputer single-chip, where the detector absorbs radioactive particles to generate signal pulses; the signal converter is connected to the detector; the signal converter converts the signal pulses into digital pulses through a discriminating-and-amplifying circuit; the microcomputer single-chip is connected to the signal converter; the microcomputer single-chip comprises a reading module, a statistical analysis unit and a data output unit; the reading module reads charging voltages of constant-current pulses; the statistical analysis unit is connected with the reading module; the data output unit is connected with the statistical analysis unit; at a low power mode, the microcomputer single-chip obtains pulse widths of dual-channel signals of the digital pulses to process a statistical analysis and obtains pulse free-count; and, thus, a pair of information comprising random physical memory spectrum and pulse count are generated. Accordingly, a novel simplified analyzer for radiation spectrum is obtained.

BRIEF DESCRIPTION OF THE DRAWINGS

The present invention will be better understood from the following detailed description of the preferred embodiment according to the present invention, taken in conjunction with the accompanying drawings, in which.

DESCRIPTION OF THE PREFERRED EMBODIMENT

Figure 1:
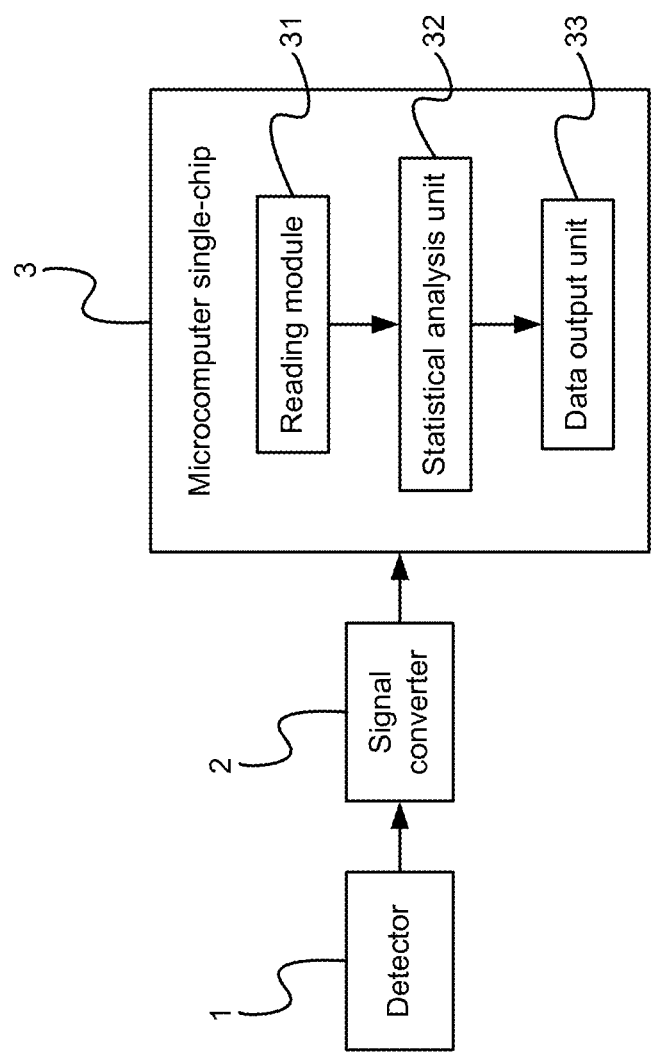
FIG. 1 is the block view showing the preferred embodiment according to the present invention.

The following description of the preferred embodiment is provided to understand the features and the structures of the present invention.

Please refer to FIG. 1-FIG. 4, which are a block view showing a preferred embodiment according to the present invention; a structural view showing a reading module; a view showing a microcomputer single-chip used for analyzing radiation spectrum; a view showing an analysis result of radiation spectrum obtained by a statistical analysis unit. As shown in the figures, the present invention is a simplified radiation spectrum analyzer, comprising a detector 1, a signal converter 2 and a microcomputer single-chip 3.

The detector 1 is used to absorb radioactive particles to generate signal pulses.

The signal converter 2 is connected to the detector 1 to directly convert the signal pulses into digital logic pulses through a discriminating-and-amplifying circuit.

The microcomputer single-chip 3 is connected to the signal converter 2 and comprises a reading module 31, a statistical analysis unit 32 and a data output unit 33. The reading module 31 reads charging voltages of constant-current pulses. The statistical analysis unit 32 is connected with the reading module 31. The data output unit 33 is connected with the statistical analysis unit 32. At a very low power mode, the microcomputer single-chip 3 measures pulse widths of dual-channel signals of the digital logic pulses to process a statistical analysis and obtains a pulse free-count; and, thus, a pair of information comprising random physical memory spectrum and pulse count are generated. Therein, the dual-channel signals are generated by sensing different radiations through the same detector or different detectors. Thus, a novel simplified radiation spectrum analyzer is obtained.

Figure 2:
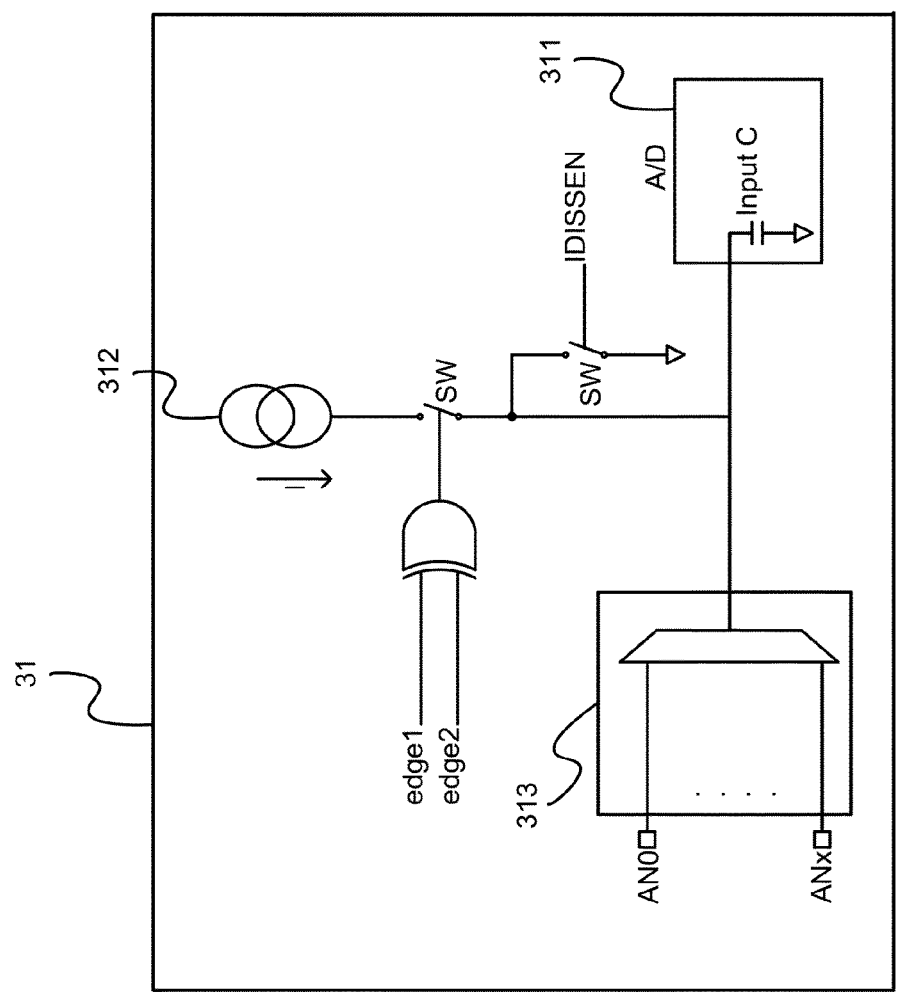
FIG. 2 is the structural view showing the reading module.

The reading module 31 has a non-clock timing measurement, whose hardware architecture is shown in FIG. 2. The reading module 31 comprises a capacitor 311, a constant-current source 312 and an analog-to-digital converter (ADC) 313. Changes of input of digital logic pulse signals are measured to be inputted for deciding starting or stopping charging the capacitor 311 located at an input end of the ADC 313 by the constant-current source 312. After charging stops, the ADC 313 obtains timing by measuring a voltage of the capacitor 311.

The reading module 31 is a circuit of charge time measurement unit (CTMU). The constant current for charging can be continuously adjusted in a range of 100:1 by using commands, where the ADC 313 has a resolution of 10 bit, i.e. 1024:1. Hence, on using the present invention for analyzing pulse widths, the best resolution can be achieved by adjusting the constant current without increasing the timing pulse frequency.

On analyzing pulse widths, the microcomputer single-chip 3 takes full responsibility for measuring by the ADC 313; discharging charge; analyzing data; and storing statistic result. Hence, for fulfilling the requirement of operating at a low frequency pulse (<1 MHz) to reduce power consumption, the fastest pulse is about 20000 times per second. For applications of detecting pollution of small-caliber pipe, the background pulses are usually less than 20 times per second owing to the limitation of detector volume—which shows practical match.

When a pulse time-domain analysis chip is used for detecting single-channel pulse spectrum, a simple logic gate can be used to compare the signal pulses with reference pulses of another channel for generating a coincidence-anticoincidence logic to switch on/off the detection of pulse spectrum. For example, radiation pulse signals of two channels are used to simultaneously generate coincidence-anti-coincidence spectrum for significantly reducing interference of background radiation and enhancing accuracy of investigation and analysis of radiation spectrum.

Figure 3:
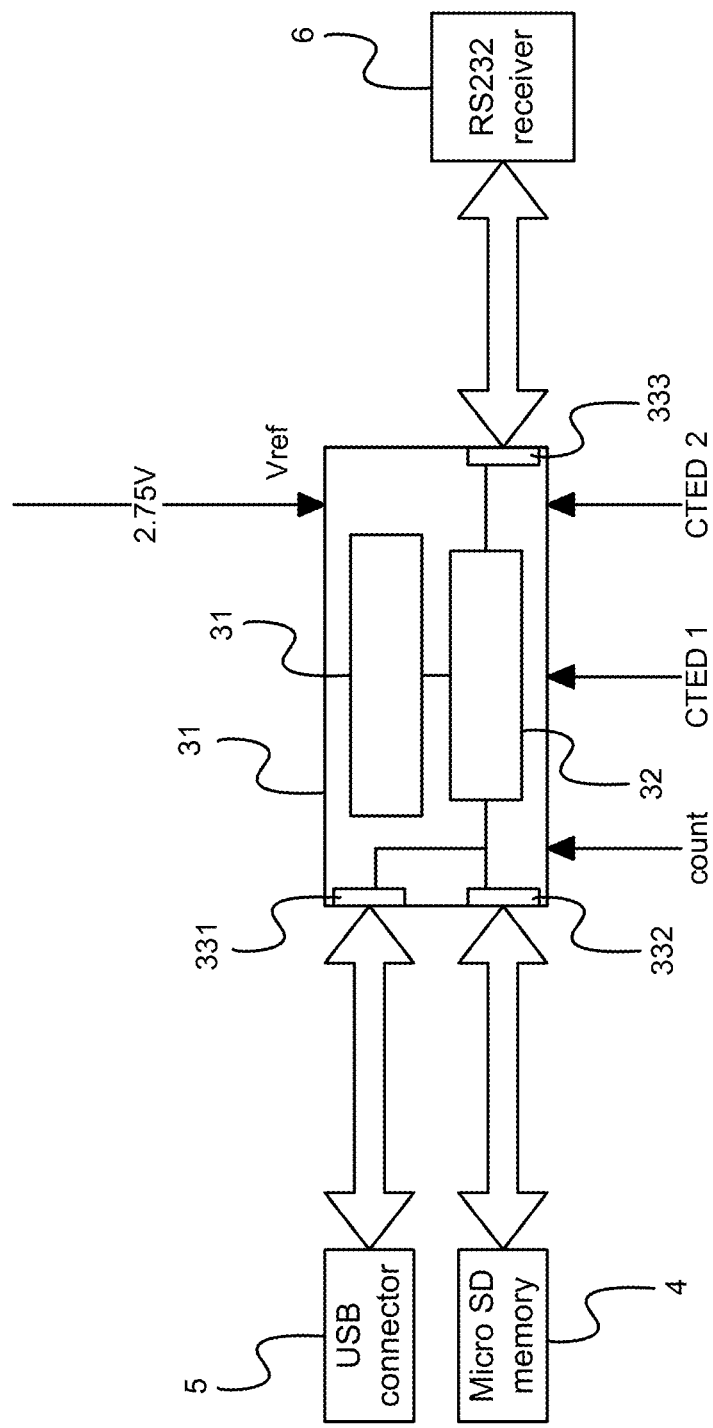
FIG. 3 is the view showing the microcomputer single-chip used as the nuclide-spectrum analysis module.

The microcomputer single-chip 3 having the built-in reading module 31 is used as a nuclide-spectrum analysis module, as shown in FIG. 3. On using, signal pulses of different sources are inputted from CTEDG1,2 (triggered by the edge of the reading module 31) for width analysis when the reading module 31 uses a 55-microampere (uA) fixed current source with a 10 bit ADC having 2.75V reference voltage ($V_{ref}$). Thus, the relationship between the measurement limit of pulse width ($T_{max}$) of the ADC and the input capacitance ($C_{in}$) of AN# is $T_{max}=50 \times C_{in}$. Generally, the input capacitance of AN# at background is about 30 picofarads (pF). Hence, the CTMU used in the present invention has a relationship to the ADC that a precision range of 0~1024 is corresponding to the full range of pulse width of the ADC, which is 0~1500 nanoseconds (nsec). After AN# is connected with 30 pF, the range of pulse width for measurement is 0~3000 nsec; after with 60 pF, the range 0~4500 nsec; and so on.

Additional advantage of the microcomputer single-chip 3 having the built-in reading module 31 used in the present invention uses the full-function peripheral data output unit 33. In FIG. 3, the data output unit 33 comprises a plurality of high-speed USB transfer interfaces 331 connected to an external expanded memory; a plurality of micro SD interfaces 332 connected to a built-in expanded memory, an external expanded memory or a system expanded memory; and a plurality of RS232 interfaces 333 for debugging and transferring data through wire. Thus, with the high-capacity micro SD memory card 4, the high-speed USB connector 5 and the RS232 transceiver 6, the results of nuclide-spectrum analysis obtained during a long time is automatically stored for analysis by offline-reading afterwards. In this way, the present invention is very practical on surveying radioactive contamination of long buried pipeline.

Figure 4:
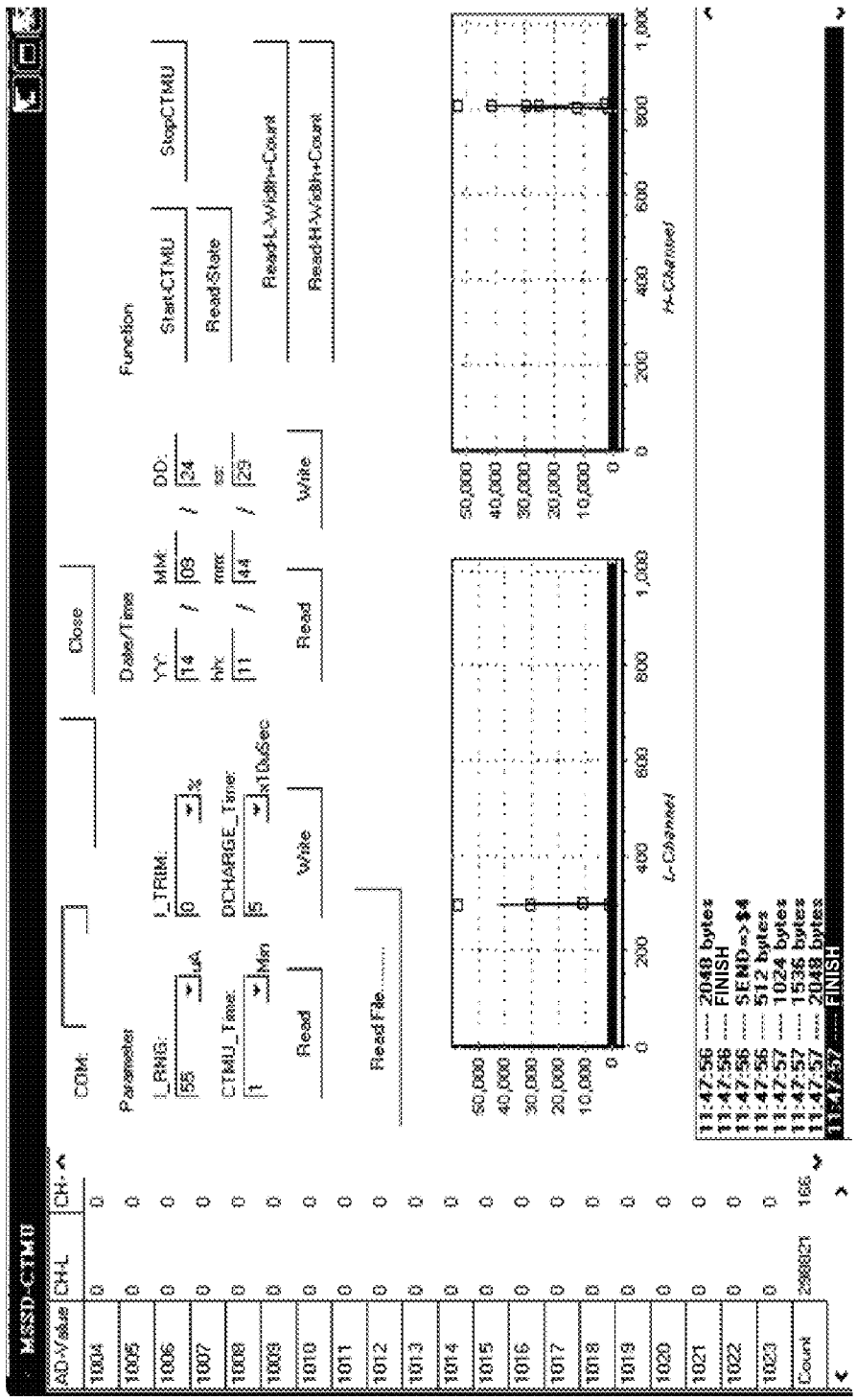
FIG. 4 is the view showing the nuclide spectrum measured with dual-channel pulse width by the nuclide-spectrum analysis module.
Figure 5:
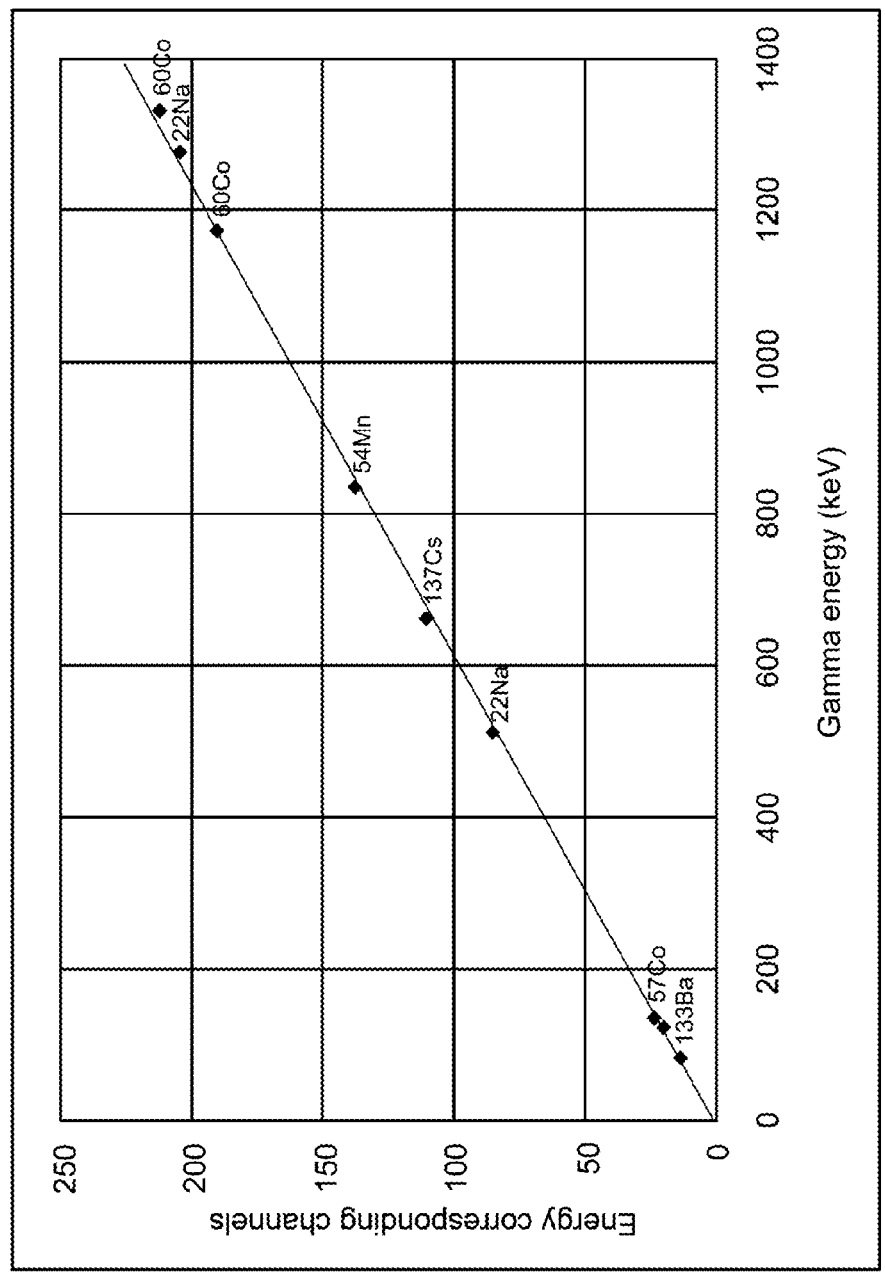
FIG. 5 is the view of the relationship between pulse peak and energy of the prior art.
Figure 6:
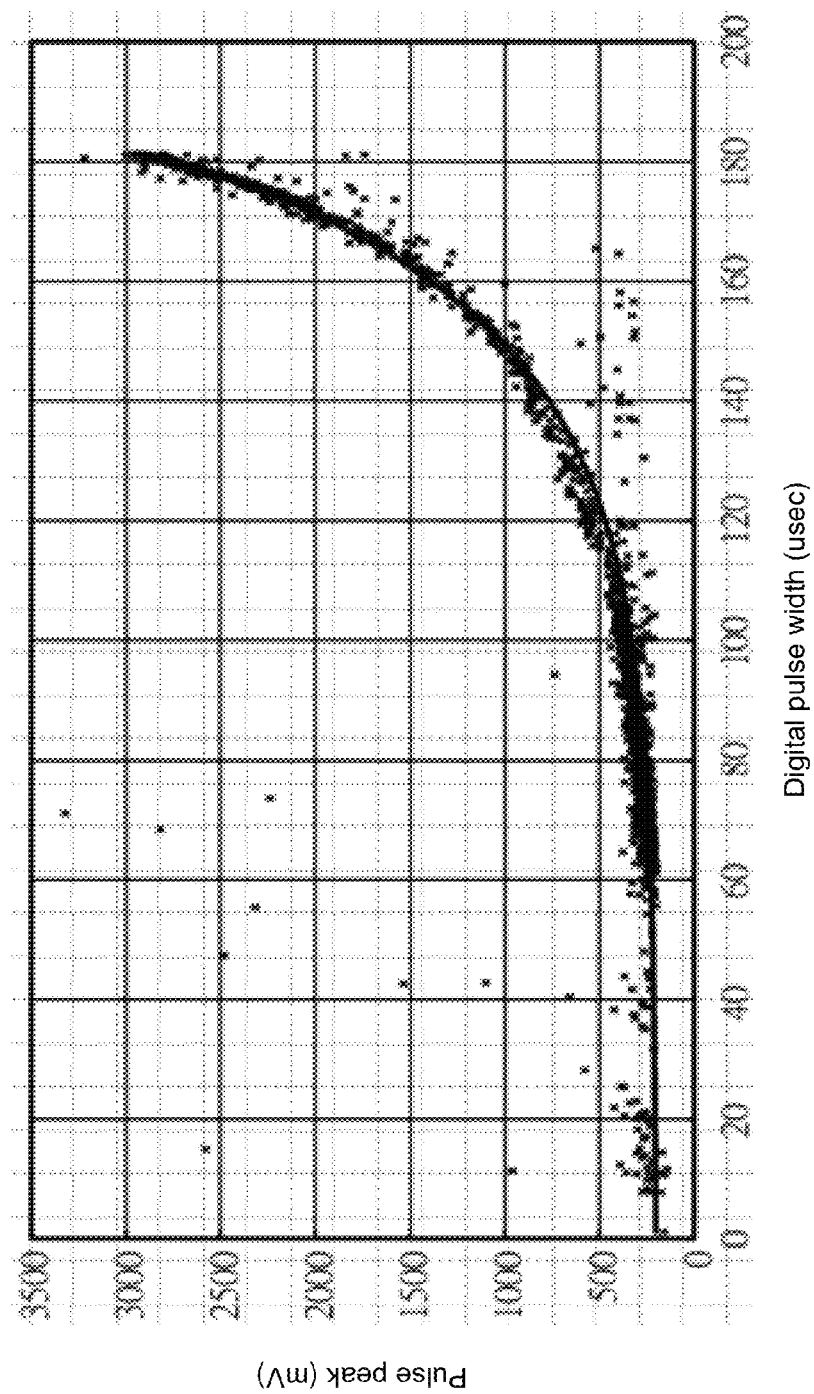
FIG. 6 is the view of the relationship between pulse width and pulse peak or energy of the prior art.

In FIG. 4, nuclide spectrum is measured with dual-channel wide/narrow pulse width by the nuclide-spectrum analysis module. The reading module 31 separately measures a controller in a passive mode and an active mode under a condition comprising a constant current source=55 uA, a current-source value trim=0%, a wide/narrow pulse-width measurement time=60 seconds, an analog-to-digital-converting discharge time=50 uSec, a wide-pulse analog-to-digital-converting channel capacitance=100 pF, a narrow-pulse analog-to-digital-converting channel capacitance=25 pF, a wide/narrow pulse signal frequency=10 KHz and a negative pulse width=2 uSec. The measurement result is as follows: the position for wide pulse width is about an analog-to-digital conversion value of 297; the position for narrow pulse width is about an analog-to-digital conversion value of 808; the count for wide pulse peak is 298921; and the count for narrow pulse peak is 166321. As comparing to the total number of 300K signal pulses fed, the loss ratios of wide/narrow pulse counts are respectively 1% and 45%, which are different owing to the programming. The microcomputer single-chip 3 processes the wide pulse at first; then, the procedure is turned to the analog-to-digital conversion of narrow pulse and the statistical analysis of signals. The time increases and, thus, loss happens.

The present invention uses pulse time-domain analysis to replace the traditional analog-to-digital conversion analysis. The largely supplied low-cost microcomputer single-chip is applied as a touch-driven device with the built-in reading module replacing the high-frequency precise clock for analyzing spectrum of signal pulses of gamma ray sensed by the detector under a very-low power mode. Hence, radiation-polluted nuclides are identified by the detector at a room temperature for gamma-lay contamination investigation of long small-caliber buried pipelines both at inside and outside areas of a plant.

To sum up, the present invention is a simplified radiation spectrum analyzer, where a microcomputer single-chip having a built-in reading module analyzes spectrum of signal pulses of gamma ray sensed by a detector under a very low power mode; and, radiation-polluted nuclides are thus identified by the detector at a room temperature for gamma-lay contamination investigation of long small-caliber pipelines buried at inside and outside areas of a plant.

The preferred embodiment herein disclosed is not intended to unnecessarily limit the scope of the invention. Therefore, simple modifications or variations belonging to the equivalent of the scope of the claims and the instructions disclosed herein for a patent are all within the scope of the present invention.

What is claimed is:

1. A simplified analyzer for radiation spectrum, comprising:
    a detector,
        wherein said detector absorbs radioactive particles to generate signal pulses;
    a signal converter, said signal converter being connected to said detector,
        wherein said signal converter converts said signal pulses into digital pulses through a discriminating-and-amplifying circuit; and
    a microcomputer single-chip, said microcomputer single-chip being connected to said signal converter,
        wherein said microcomputer single-chip comprises a reading module, a statistical analysis unit and a data output unit; said reading module reads charging voltages of constant-current pulses; said statistical analysis unit is connected with said reading module; said data output unit is connected with said statistical analysis unit;
        wherein, at a low power mode, said microcomputer single-chip obtains pulse widths of dual-channel signals of said digital pulses to process a statistical analysis and obtains pulse free-count; and, thus, a pair of information comprising random physical memory spectrum and pulse count are obtained.

2. The simplified analyzer according to claim 1,
wherein said reading module is a circuit of charge time measurement unit (CTMU).

3. The simplified analyzer according to claim 1,
wherein said data output unit comprises a plurality of high-speed USB transfer interfaces; a plurality of micro SD interfaces; and a plurality of RS232 interfaces.

4. The simplified analyzer according to claim 3,
wherein said high-speed USB interfaces are connected to an external expanded memory.

5. The simplified analyzer according to claim 3,
wherein said micro SD interfaces are connected to a device selected from a group consist of a built-in expanded memory, an external expanded memory and a system expanded memory.

6. The simplified analyzer according to claim 3,
wherein said RS232 interfaces processes debugging and transfers data through wire.

7. The simplified analyzer according to claim 1,
wherein said dual-channel signals are obtained by sensing different radiations through devices selected from a group consist of the same detector and different detectors.

8. The simplified analyzer according to claim 1,
wherein said microcomputer single-chip is operated with pulses having low frequencies less than 1 mega-hertz (MHz).

9. The simplified analyzer according to claim 1,
wherein said reading module comprises a capacitor, a constant-current source, and an analog-to-digital converter (ADC).

10. The simplified analyzer according to claim 9,
wherein said reading module starts and stops charging said capacitor located at an input end of said ADC by said constant-current source according to changes of input of digital pulses; and, after charging stops, said ADC obtains timing by obtaining a voltage of said capacitor.

* * * * *